United States Patent
Whinnett et al.

(10) Patent No.: US 7,159,168 B2
(45) Date of Patent: Jan. 2, 2007

(54) ITERATIVE DECODING WITH LIKELIHOOD WEIGHTING

(75) Inventors: Nicholas Whinnett, Barnfield (GB); Steven Wood, Hotwells (GB); Xiaoyong Yu, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 152 days.

(21) Appl. No.: 10/530,941

(22) PCT Filed: Nov. 7, 2003

(86) PCT No.: PCT/EP03/50798

§ 371 (c)(1), (2), (4) Date: Apr. 8, 2005

(87) PCT Pub. No.: WO2004/042989

PCT Pub. Date: May 21, 2004

(65) Prior Publication Data
US 2006/0168500 A1  Jul. 27, 2006

(30) Foreign Application Priority Data
Nov. 7, 2002  (GB) .................................. 0225975.2

(51) Int. Cl.
*H03M 13/29* (2006.01)
(52) U.S. Cl. ...................................... 714/794; 714/755
(58) Field of Classification Search ................ 714/755, 714/794; H03M 13/29
See application file for complete search history.

(56) References Cited

U.S. PATENT DOCUMENTS 5,867,532 A * 2/1999 Ito et al. ..................... 375/265

2005/0086570 A1 * 4/2005 Ariyoshi .................... 714/755

FOREIGN PATENT DOCUMENTS

EP  1 063 776 A  12/2000
WO  WO 01 43294 A  6/2001

OTHER PUBLICATIONS

Hagenauer J.: "Source-Controlled Channel Decoding", IEEE Transactions on Communications, IEEE Inc., New York, US, vol. 43, No. 9, Sep. 1, 1995, pp. 2449-2457.

* cited by examiner

*Primary Examiner*—R. Stephen Dildine

(57) ABSTRACT

The invention relates to an error correcting decoder apparatus (100) and method. The decoder apparatus (100) comprises a likelihood estimator (101) which generates a sequence of bit value likelihood estimates, such as log likelihood ratios, for multi bit symbols of a data sequence. The decoder apparatus (100) further comprises a decoder element (103), such as a Maximum A Priori (MAP) or appropriate Soft Output Viterbi decoder. The decoder element (103) generates a decoded data sequence in response to the bit value likelihood estimates. The decoder apparatus (100) also comprises a weighted processor (105) which generates a weighted compensation data sequence from the decoded data sequence. The weighted compensation data is used to modify the sequence of bit value likelihood estimates. The decoding is subsequently repeated using the improved bit value likelihood estimates whereby improved decoding performance is achieved. The invention may be applied to a two decoder element decoding apparatus (200) and may specifically be applied to turbo decoders.

26 Claims, 1 Drawing Sheet

ITERATIVE DECODING WITH LIKELIHOOD WEIGHTING

FIELD OF THE INVENTION

The invention relates to a decoder apparatus and method of decoding therefor and in particular to a turbo decoder apparatus and method.

BACKGROUND OF THE INVENTION

Over the last decades, the use of digital communication has increased drastically, and a great many digital communication systems have been developed and deployed. For example, the first generation analogue cellular communication systems have now been replaced by $2^{nd}$ generation digital cellular communication system, such as the Global System for Mobile communication (GSM).

Currently, $3^{rd}$ Generation cellular communication systems, such as the Universal Mobile Telecommunication System (UMTS), is being deployed. In UMTS, the available frequency resource must be shared between a high number of user equipment and services. In UMTS, the available frequency spectrum is divided into one or few wild band channels having a bandwidth of 5 MHz. Typically, one wide band frequency channel is used for uplink in all cells and a different wide band frequency channel is used for downlink. In this case, separation between cells is achieved through the use of spread spectrum techniques, where each cell is allocated a cell specific long user spreading code.

In these systems, a signal to be transmitted is multiplied by the spreading code, which has a chip rate typically much larger than the data rate of the signal. Consequently, a narrowband signal is spread over the wideband frequency channel. In the receiver, the received signal is multiplied by the same spreading code thereby causing the original narrowband signal to be regenerated. However, signals from other cells having different spreading codes are not despread by the multiplication in the receiver, and remain wideband signals. The majority of the interference from these signals can consequently be removed by filtering of the despread narrowband signal, which can then be received.

Separation between mobile stations of the same cell is also achieved by use of spread spectrum techniques. The signal to be transmitted is multiplied by a user specific code. Similarly, the receiver multiplies the received signal with the user specific code, thereby recovering the originally transmitted signal without despreading signals from any of the other mobile stations. Thus, the interference from all other mobile stations, whether in the same or a different cell, can effectively be reduced by filtering.

A consequence of the spread spectrum techniques employed is that the amount of the interfering signals, which fall within the bandwidth of the narrowband signal, cannot be removed by filtering, and will thus reduce the signal to interference ratio of the received signal. Consequently, it is of the outmost importance that the interference between mobile stations is optimised in order to maximise the capacity of the system. The reduction of the interference from an unwanted mobile station is equal to the ratio between the bandwidth of the spread signal and the narrowband despread signal, equivalent to the ratio between the chip rate and the symbol rate of the transmitted signal. This ratio is known as the processing gain. The technique is known as Code Division Multiple Access (CDMA), and further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In order to communicate efficiently in the presence of noise and interference, UMTS as most other digital communication systems provide for error correcting coding and decoding. Hence, the information symbols to be transmitted are encoded by an error correcting code in the transmitter, and the received signal is decoded in the receiver using a suitable decoder. Many different error correcting codes and decoding techniques are known including for example block codes and convolutional codes. Especially, the latter are used extensively in cellular communication systems because they have a high performance and provide a high degree of robustness in the adverse radio conditions frequently encountered in cellular communication systems. Examples of decoder techniques for decoding convolutional codes include Viterbi decoding and Turbo decoding.

UMTS has been developed with a view to provide high data rates and a high number of different services. In order to efficiently communicate high data rates, release 5 of the UMTS Technical Specifications, in contrast to $2^{nd}$ Generation systems, allows for the use of higher order symbols of more than four constellation points for some services. As the Euclidean distance between different constellation points for the same symbol energy decreases for an increasing number of constellation points, the uncoded error rate increases for higher order symbols. This effect is preferably compensated by use of improved error correcting coding and therefore the performance of the error coding applied to the information data becomes of increasing importance.

Consequently, UMTS (release 5) prescribes the use of highly efficient codes and specifically the use of Turbo decodes. However, these codes are complex and the complexity is increased due to the higher order symbols. Additionally, the error probability of a given bit is increased due to the uncertainty in the decoding process of the value of other bits comprised in the higher order symbols. Furthermore, although the conventional implementation of turbo codes provides high performance, they do not attain the lower theoretical bound for bit error rates. Also, conventional turbo coders assume that the noise is independent from symbol to symbol, which is not the case for multi-level alphabets.

Additionally, any improvement in the performance of error correcting coding and decoding will not only provide for an improvement in the achieved bit error rate but may also allow for lower transmit powers. For a cellular communication system, this may result in reduced interference and ultimately in an improved capacity of the communication system.

Consequently an improvement in performance and/or reduction in complexity of an error correcting system would be highly advantageous.

SUMMARY OF THE INVENTION

Accordingly, the Invention seeks to mitigate, alleviate or eliminate one or more of the above mentioned disadvantages singly or in any combination.

Accordingly there is provided a decoder apparatus comprising: a likelihood estimator for generating a sequence of bit value likelihood estimates of a sequence of bit values of multi bit symbols of a data sequence; a first decoder element for generating a first decoded data sequence in response to the bit value likelihood estimates; a weighting processor for generating a weighted compensation data sequence in response to the first decoded data sequence and reliabilities of the data of the first decoded data sequence; and wherein the likelihood estimator is operable to modify the sequence of bit value likelihood estimates in response to the weighted compensation data.

The decoder performance is improved by the bit value likelihood estimates being modified from the first decoded data sequence. Specifically, the first decoded data sequence may be used to modify the bit value likelihood estimates such that decoded bits that are correctly decoded with high probability modify the bit value likelihood estimates so as to reflect an increased probability for this bit value. In particular the modifying of the bit value likelihood estimates may reflect feedback of decisions of the decoded data thereby introducing decision feedback for the decoder. Specifically, the bit value likelihood estimates for a given bit may be modified by using the first decoded data sequence to assist in the determination of the bit value of other bits of the higher order data symbol. The improvement in performance of the decoding process may specifically be represented by a reduced data error of the decoded data sequence.

The likelihood estimator may be a separate entity or may be an integral part of the first decoder element. As such the bit value likelihood estimates may be generated independently of the decoding process or may be an integral part of the decoding process such as for example associated with the derivation of branch metrice for trellis based decoders.

The performance improvement provides additional advantages of a reduced decoded error rate, reduced required transmit power, reduced interference and/or increased capacity of the communication system.

According to a first feature of the invention, the first decoder element is a Maximum A Posteriori (MAP) decoder. This decoder is suitable for implementation of the decoder apparatus and in combination with the previously described features provide very high performance with low bit error rates.

According to another feature of the invention, the first decoder element is a Soft Output Viterbi Algorithm (SOVA) decoder. Thus decoder is suitable for implementation of the decoder apparatus and in combination with the previously described features provide very high performance with low bit error rates.

According to another feature of the invention, the first decoded data sequence comprises data values associated with the reliabilities of the data of the first decoded data sequence. Advantageously, an efficient representation of both data values and a measure of the probability of correct decoding decision is comprised in the first decoded data sequence. Specifically, a soft decision data value may be used to indicate both data value and reliability.

According to another feature of the invention, the data sequence comprises an uncoded information data sequence, a first coded sequence generated from encoding of data of the information data sequence and a second coded sequence generated from encoding of interleaved data of the information data sequence; and the first decoder is operable to generate the first decoded sequence in response to bit value likelihood estimates of the information data sequence and the first coded sequence; the decoder apparatus further comprising: an interleaver coupled to the output of the first decoder element; a second decoder element coupled to the interleaver and operable to generate a second decoded data sequence in response to bit value likelihood estimates of the information sequence and the second coded sequence. Improved performance can be achieved through the use of the second decoder thereby potentially reducing error rates, transmit powers, interference and/or increasing the capacity of the communication system.

According to another feature of the invention the second decoder element is a Maximum A Posteriori (MAP) decoder. This decoder is suitable for implementation of the decoder apparatus and in combination with the other features provide very high performance with low bit error rates.

According to another feature of the invention the second decoder element is a Soft Output Viterbi Algorithm (SOVA) decoder. This decoder is suitable for implementation of the decoder apparatus and in combination with the other features provide very high performance with low bit error rates.

According to another feature of the invention, the second decoder is operable to further generate the second decoded data sequence in response to the first decoded data sequence. Hence, the decoded data of the first decoder may be used to improve the decoding in the second decoder thereby further improving the decoding performance of the second decoder.

According to another feature of the invention, the decoder apparatus further comprises a deinterleaver coupled between the output of the second decoder element and the input of the first decoder element and wherein the first decoder element is operable to further generate the first decoded data sequence in response to the second decoded data sequence. Hence, the decoded data of the second decoder may be used to improved the decoding in the first decoder thereby further improving the decoding performance of the first decoder. The first and second decoder may thus iteratively interoperate to provide improved overall decoder performance.

According to another feature of the invention, the decoder apparatus is a turbo decoder apparatus. This decoder is highly suitable for the implementation of the decoder apparatus and provides for very high performance and low bit error rates.

According to another feature of the invention, the weighting processor is operable to generate weighted compensation data for the information data sequence in response to the first decoded data sequence and reliabilities of the data of the first decoded data sequence. This advantageously allows the bit value likelihood estimates to be improved specifically for the information data in response to the first decoded data sequence and possibly in response to only the first decoded data sequence. Specifically, only the bit value likelihood estimates of the information bits of the data sequence may be modified.

According to another feature of the invention, the weighting processor is operable to generate weighted compensation data for the first coded data sequence in response to the first decoded data sequence and reliabilities of the data of the first decoded data sequence. Hence, performance may be improved from an improvement in the bit value likelihood estimates for the first coded sequence. Specifically, the first decoded data sequence may comprise data values and reliabilities for the first coded data and this may be used for the modification of the bit value likelihood estimates of in particular the bits of the first coded data.

According to another feature of the invention, the first decoded data sequence comprises decoded data corresponding to the first coded data sequence. This allows for the advantage of the information obtained by decoding the first coded data to be used in improving the bit value likelihood estimates.

According to another feature of the invention, the weighting processor is operable to generate weighted compensation data for the information data sequence in response to the second decoded data sequence and reliabilities of the data of the second decoded data sequence. This advantageously allows the bit value likelihood estimates to be improved specifically for the information data in response to the second decoded data sequence and possibly in response to only the second decoded data sequence. Specifically, only the bit value likelihood estimates of the information bits of the data sequence may be modified.

According to another feature of the invention, the weighting processor is operable to generate weighted compensation data for the second coded data sequence in response to the second decoded data sequence and reliabilities of the data of the second decoded data sequence. Hence, performance may be improved from an improvement in the bit value likelihood estimates for the second coded sequence. Specifically, the second decoded data sequence may comprise data values and reliabilities for the second coded data and this may be used for the modification of the bit value likelihood estimates of in particular the bits of the second coded data. Additionally, weighted compensation data may be generated for the first coded data sequence in response to the second decoded data sequence and reliabilities of the data of the second decoded data sequence.

According to another feature of the invention, the second decoded data sequence comprises decoded data corresponding to the second coded data sequence. This allows for the advantage of the information obtained by decoding the second coded data to be used in improving the bit value likelihood estimates thereby resulting in improved decoder performance.

According to another feature of the invention, the second decoded data sequence comprises data values associated with the reliabilities of the data of the second decoded data sequence. Advantageously, an efficient representation of both data values and a measure of the probability of correct decoding decision is comprised in the second decoded data sequence. Specifically, a soft decision data value may be used to indicate both data value and reliability.

According to another feature of the invention, the decoder apparatus is operable to iterate the decoding operation. Hence, the improved bit value likelihood estimates can be used to provide an improved first decoded data sequence. This can be used to provide improved bit value likelihood estimates, which again can be used to provide an improved first decoded data sequence etc. In particular, if the decoder apparatus comprises two decoders, the decoded data sequence of one decoder can be used in the other decoder to improve the decoding performance of that processor and so on. Hence, a significantly improved performance of the decoder apparatus may be achieved.

According to another feature of the invention the weighting processor is operable to weight each bit of the weighted compensation data in response to the likelihood of that bit being a given value. This allows for the modification of the bit value likelihood estimates to be weighted in response to the reliability of the decision. Hence, it allows for a decision feedback which is in response to a decision probability thereby significantly reducing the probability of erroneous or detrimental feed back. Preferably, it thus allows for the feedback impact of each bit to be weighted in accordance with the certainty of the decoding decision. Thus provides for a significantly improved performance.

According to another feature of the invention, the likelihood estimator is operable to modify a bit value likelihood estimate of a bit of the sequence of bit values in response to the weighted compensation data. Preferably each bit may be modified individually in response to the probability of correct decoding decision for that bit and/or of the other data bits of the corresponding symbol.

According to another feature of the invention, the weighting processor is operable to set a value of a bit of the weighted compensation data sequence to a hard decision bit value if the reliability of the decoded data corresponding to the bit is above a threshold. This provides for an efficient implementation of the method as the complexity of the feed back is reduced. Further, decoder performance may be improved.

According to another feature of the invention, the weighting processor is operable to set a value of a bit of the weighted compensation data sequence to a null value if the reliability of the decoded data corresponding to the bit is less than a threshold. Preferably, the likelihood processor is operable not to modify a bit value likelihood estimate for a bit corresponding to a bit of the weighted compensation value having a null value. This reduces the likelihood of erroneous decoding decisions impacting the bit value likelihood estimates and thus reduces the therewith associated deterioration of performance. Consequently, this feature allows for improved performance of the decoder apparatus.

According to another feature of the invention, the bit value likelihood estimates are logarithmic likelihood ratios between the probability of a bit having a first value and a second value. This provides for a suitable and low complexity implementation of the decoder apparatus yet allowing for high performance.

According to a second aspect of the invention, there is provided a method of decoding comprising repeating the steps of: generating a sequence of bit value likelihood estimates of a sequence of bit values of multi bit symbols of a data sequence; generating a first decoded data sequence in response to the bit value likelihood estimates; generating a weighted compensation data sequence in response to the first decoded data sequence and reliabilities of the data of the first decoded data sequence; and modifying the sequence of bit value likelihood estimates in response to the weighted compensation data.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

Figure 1:
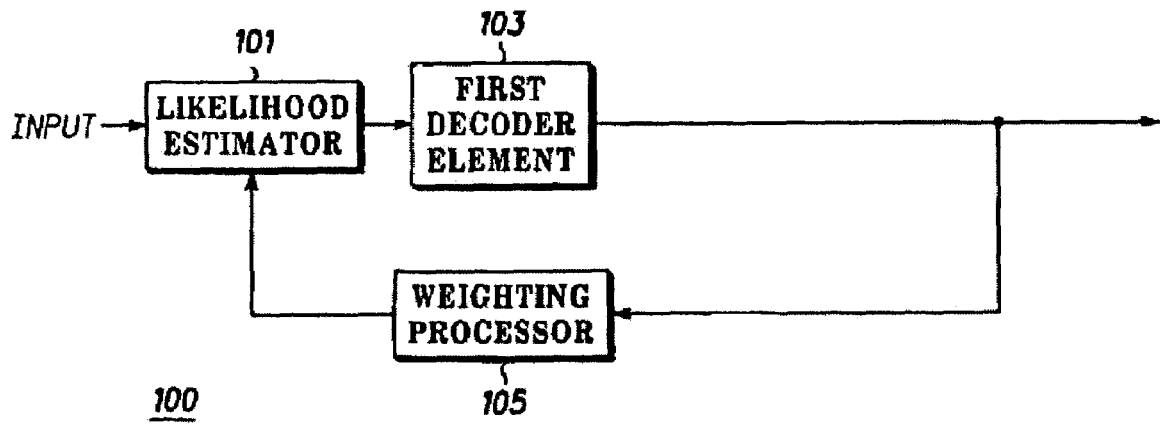
FIG. 1 is a decoder apparatus in accordance with an embodiment of the invention.

FIG. 1 is a decoder apparatus 100 in accordance with an embodiment of the invention.

The decoder apparatus 100 comprises a likelihood estimator 101 which receives a data sequence comprising data to be decoded. The likelihood estimator generates bit value likelihood estimates for the bit values of the data sequence. Specifically, in the preferred embodiment, the likelihood estimator generates a log likelihood ratio representing the relative probability of a bit having one the two possible bit values. Initially, this likelihood estimate is based on the received samples corresponding to the symbol of that bit.

Thus the bit value likelihood estimate may be determined as $$LLR(p_k) = \ln\frac{p(p_k = 1|u_k)}{p(p_k = 0|u_k)}$$

wherein LLR represents the log likelihood ratio, $p_k$ is the current bit and $u_k$ is the received data symbol.

In the following, the LLR generation of the likelihood estimator 101 is by way of example illustrated for the case of higher order symbols such as a Quadrature Amplitude Modulated (QAM) symbols or Phase shift Keying (PSK) communicated over an Additive White Gaussian Noise (AWGN) channel.

For example, 4 bits are mapped into one 16-QAM symbol, 2 bit, denoted by $i_1$ and $i_2$, are mapped into real part of a symbol as $s_I = 2\ i_1 + i_2$ and the other 2 bits, $q_1$ and $q_2$, are mapped into imaginary part of the symbol as $s_Q = 2\ q_1 + q_2$, where each bit takes a value of 1 or −1. Consequently, one symbol can be denoted by $s = s_I + js_Q$.

The received signal in one symbol interval can be written as $$r = s + n = (s_I + js_Q) + (n_r + jn_Q)$$

where n is complex white Gaussian noise. The probability density function (pdf) of r is $$p(r) = \frac{1}{2\pi\sigma_I\sigma_Q}\exp\left(-\frac{(r-s_1)^2}{2\sigma_1^2} - \frac{(r-s_Q)^2}{2\sigma_Q^2}\right)$$

where $\sigma_I^2 = \sigma_Q^2 = E(n_r^2) = E(n_Q^2)$ represents the energy of the Gaussian noise. The log likelihood function for $s_I$ and $s_Q$ can be expressed as $$LL = -(r-s_I)^2 - (r-s_Q)^2$$

The log likelihood ratio LLR of a bit may consequently determined as $$\begin{aligned}LLR(b_k) &= \ln\frac{LL(b_k = 1)}{LL(b_k = -1)}\\ &= \max_{b_j \in S_1}\{-(r-s_1)^2 - (r-s_Q)^2\} - \max_{b_j \in S_{-1}}\{-(r-s_1)^2 - (r-s_Q)^2\}\\ &= \max_{b_j \in S_1}\{2rs_1 - s_1^2 + 2rs_Q - s_Q^2\} - \max_{b_j \in S_{-1}}\{2rs_1 - s_1^2 + 2rs_Q - s_Q^2\}\end{aligned}$$

where $S_1$ and $S_{-1}$ are sets of ($s_I$, $s_Q$) corresponding to $b_k = 1$ and −1 respectively, and $b_k$ represents any one of bit corresponding to a symbol.

For example, in case of 16 QAM:

$s_I = -3, -1, 1, 3$ for $(i_1, i_2) = (-1, -1), (-1, 1), (1, -1), (1, 1)$ $s_Q = -3, -1, 1, 3$ for $(q_1, q_2) = (-1, -1), (-1, 1), (1, -1), (1, 1)$ The log likelihood function of $i_1 = 1$ is picked up among 8 values determined by $\{2rs_I - s_I^2 + 2rs_Q - s_Q^2\}$ corresponding to $s_I > 0$. Similarly, the log-likelihood function of $i_1 = -1$ is the largest one among 8 quantities of $\{2rs_I - s_I^2 + 2rs_Q - s_Q^2\}$ evaluated for 8 symbols corresponding to $s_I < 0$.

The decoder apparatus further comprises a first decoder element 108 for generating a first decoded data sequence in response to the bit value likelihood estimates. Although the likelihood estimator is shown as separate from the first decoder element, it may be an integral part of this and other decoder elements of the decoder apparatus. Specifically, the likelihood estimator may in some embodiments generate bit value likelihood estimates used for branch metrics in trellis based decoders.

In the preferred embodiment, the received data sequence has been transmitted using a convolutional encoding process, and the first decoder element 103 is a Maximum A Priori (MAP) decoder which is operable to decode the convolutionally encoded signal based on the derived log likelihood ratios determined by the likelihood estimator 101. Specifically, the MAP decoder may be a log MAP or a max log MAP decoder. A log MAP decoder is characterised by a symbol-by-symbol decoding process in which the likelihood of correct symbol decision is maximised by considering products and sums of likelihood ratios expressed in logarithmic units. The max log MAP decoder is characterised by a symbol-by-symbol decoding process in which the likelihood of correct symbol decision is increased by considering products and approximations to sums of likelihood ratios in logarithmic units.

Alternatively, the first decoder element is a Soft Output Viterbi Algorithm (SOVA) decoder. This SOVA decoder is characterised by a symbol-by-symbol decoding process in which the likelihood of correct symbol decision is increased by considering the sums of logarithmic likelihood ratios of a set of candidate paths through a code trellis.

The first decoder element 103 in the preferred embodiment generates a decoded data sequence, which not only represents the decoded estimate of the bit values but also an indication of the reliability of this estimate. In the preferred embodiment, the first decoder element 103 generates a soft decision output wherein the magnitude of the bit value is indicative of the probability of a correct bit value. Specifically, the output of the first decoder element 103 generates decoded data values which themselves are log likelihood ratios. Hence, the decoded data sequence comprises data values that are associated with the reliabilities of the data of the decoded data sequence.

The decoder apparatus 100 further comprises a weighting processor 105 connected to the output of the first decoder element 103 and the likelihood estimator 101. The weighting processor 105 is operable to generate a weighted compensation data sequence in response to the decoded data sequence of the first decoder element 103 as well as the reliabilities of the data of the decoded data sequence. Each bit of the compensation data sequence is in the preferred embodiment scaled according to the reliability of the corresponding bit of the decoded data sequence, such that the introduced compensation is more significant for decoded data which is known with high reliability.

Specifically, the weighting processor 105 is operable to set a value of a bit of the weighted compensation data sequence to a hard decision bit value if the reliability of the decoded data corresponding to the bit is above a threshold, and to set a value of a bit of the weighted compensation data sequence to a null value if the reliability of the decoded data corresponding to the bit is less than a threshold. Thus, for each bit, the weighting processor 105 estimates the reliability of the decoded bit value. If the reliability is above this threshold, it sets the corresponding bit of the compensation data to the hard decision decoded bit value. If it is below the threshold value, the corresponding bit of the compensation data is set to a null value, which specifically may be a value not indicating any information related to a decoded bit value.

The likelihood estimator 101 is connected to the weighting processor 105 and is operable to modify the sequence of bit value likelihood estimates in response to the weighted compensation data. Hence, after the first decoder element 103 has generated a decoded sequence on the basis of the bit value likelihood estimates, the decoded data sequence is used to modify the bit value likelihood estimates in order to improve the derived bit value likelihood estimates. The first decoder element 103 subsequently repeats the decoding process based on the improved bit value likelihood estimates thereby generating an improved decoded sequence. This sequence may again be used to generate improved bit value likelihood estimates, and the process may thus be iterated as many times as required or desired. Specifically, the process may be repeated for a predetermined number of times or until the decoded data sequence attains a given reliability.

In the preferred embodiment, the modification of the bit value likelihood estimates comprises using any weighted compensation data bits corresponding to hard decisions to narrow the number of constellation points over which the maximisation is made over. Specifically, if all other bits of a specific symbol are set to their corresponding hard decision value by the weighting processor 105, no maximisation is required in order to derive a log likelihood ratio for higher order symbols. This reduces the probability of a log likelihood ratio being determined on the basis of erroneous assumptions about other bit values, and therefore results in improved performance. It further reduces complexity as the maximisation is not required over all possible constellation points. As a specific example, if all other bit values of a given symbol are known from their hard decision decoded data values (i.e. with high reliability), the log likelihood value can be calculate directly. For example, given $i_2=1$, $q_1=-1$, $q_2=1$, the log-likelihood value of $i_1=1$ is $$LL(i_1=1)=2r3-3^2-2r-1=4r-10.$$

Similarly, $$LL(i_1=-1)=-2r-1-2r-1=-4r-2$$

Hence, the log likelihood ratio can directly be calculated as $$LLR(i_1)=LL(i_1=1)-LL(i_1=-1)=8r-8.$$

In other embodiments, other and potentially more complex modifications may be made. For example, the derived bit value likelihood estimate (e.g. log likelihood ratio) for a given bit may directly be biased in the direction of the decoded bit value for that bit. The extent of the bias may be determined in response to the reliability of the decoded bit value. In this case, the weighted compensation data may represent the bias to be applied to the bit value likelihood estimates.

In the following, an example will be described of an embodiment wherein the decoder apparatus comprises a turbo decoder. Further description of conventional turbo decoders can be found in "Comparative Study of Turbo Decoding Techniques: An Overview", by J. F. Woodard and L. Hanzo, IEEE Transactions on Vehicular Technology, Vol. 49 No 6, November 2000.

Figure 2:
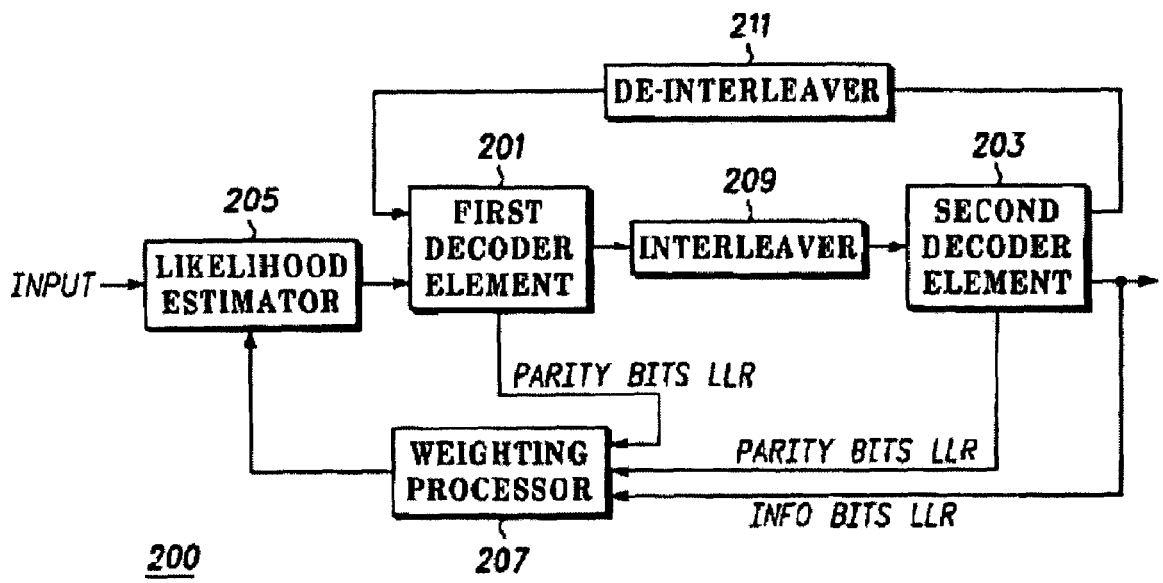
FIG. 2 is an illustration of a decoder apparatus having two decoder elements in accordance with an embodiment of the invention.

FIG. 2 is an illustration of a decoder apparatus 200 having two decoder elements 201, 203 in accordance with an embodiment of the invention. Similar to the decoder apparatus 100 of FIG. 1, the decoder apparatus 200 of FIG. 2 comprises a likelihood estimator 205, a first decoder element 201, which preferably is a MAP or SOVA decoder element, and a weighting processor 207. Further, the decoder apparatus 200 comprises an interleaver 209 coupled to the output of the first decoder element 201, and a second decoder element 203 coupled to the interleaver 209. The sound decoder element 203 is operable to generate a second decoded data sequence in response to bit value likelihood estimates generated by the likelihood estimator 205 or the first decoder element 201 and interleaved by the interleaver 209.

In this embodiment, the received signal comprises data which has been coded in accordance with a Turbo encoding scheme. Hence, the data sequence comprises an uncoded information data sequence, a first coded sequence generated from encoding of data of the information data sequence, and a second coded sequence generated from encoding of interleaved data of the information data sequence.

In the described embodiment, the first decoder 201 is operable to generate the first decoded sequence in response to bit value likelihood estimates of the information data sequence and the first coded sequence. The second decoder 203 is operable to generate a second decoded data sequence in response to bit value likelihood estimates of the information sequence and the second coded sequence. Preferably, the second decoder can use bit value likelihood estimates for the information data sequence derived by the likelihood estimator 205 or by the first decoder 201 (as the first decoded data sequence). Thus, the second decoder 203 is operable to generate the second decoded data sequence in response to the first decoded data sequence. In this way significantly improved performance of the decoding can be achieved.

The decoder apparatus 200 further comprises a de-interleaver 211 coupled between the output of the second decoder element 203 and the input of the first decoder element 201. The first decoder element 201 is preferably capable of generating the first decoded data sequence in response to the bit value likelihood estimates derived by the likelihood estimator 207 or by the second decoder element 203 (as the second decoded data sequence). The interleaver 209 and deinterleaver 211 compensates for the interleaving of data between the first coded sequence and the second coded sequence performed as part of the turbo encoding.

The structure thus provides for an iterative decoding process wherein improved bit value likelihood estimates are continuously improved by decoding, and these improved bit value likelihood estimates are then used in another decoding process thereby generating even further improved decoded data.

Similarly, to the decoding apparatus of FIG. 1, the weighting processor 207 generates weighted compensation data in response to the decoded data. Specifically, the weighting processor 207 is operable to weight each bit of the weighted compensation data in response to the likelihood of that bit being a given value. The weighted compensation data is then used to improve the bit value likelihood estimates thereby improving the decoding performance and potentially reducing complexity of the decoding process. Thus the likelihood estimator 205 is operable to modify a bit value likelihood estimate of a bit of the sequence of bit values in response to the weighted compensation data.

The weighting processor 207 is operable to generate weighted compensation data for the information data sequence. This weighted compensation data may be generated in response to the first decoded data sequence and reliabilities of the data of the first decoded data sequence. Alternatively or additionally, it may be generated in response to the second decoded data sequence and reliabilities of the data of the second decoded data sequence. In the described embodiment, the first and second decoded data sequences comprise the decoded information data sequence. However, preferably the first and second decoded data sequence additionally comprise the decoded data corresponding to the first coded data sequence and the decoded data corresponding to the second coded data sequence respectively. Hence, the first and second coded data sequences are not only used as auxiliary data values for the decoding process of the first and second decoder elements, but are themselves decoded and used in the generation of the weighted compensation data.

Furthermore, the weighting processor 207 is preferably in the described embodiment operable to generate weighted compensation data not only for the information data sequence but also for the first coded data sequence in response to the first decoded data sequence and reliabilities of the data of the first decoded data sequence, and for the second coded data sequence in response to the second decoded data sequence and reliabilities of the data of the second decoded data sequence.

Hence, in accordance with different embodiments, decoded data from the first decoder element 201 or the second decoder element 203 or both may be used to generate the weighted compensation data. Furthermore, for each of these decoder elements 201, 203 the decoded information sequence or the decoded data of the coded data sequence or of both may be used to generate the weighted compensation data. However, preferably all decoded data from both decoder elements 201, 203 are used in order to optimise decoding performance.

Further, the weighted compensation data may be used to modify the information data of the received data sequence, the first coded data sequence of the received data sequence and/or the second coded data sequence of the received data. However, preferably, the weighted compensation data is applied to all of the data of the received data sequence.

In the following, an embodiment of the decoder apparatus of FIG. 2, which is particularly suitable for 3$^{rd}$ Generation communication systems, such as UMTS, will be described in more detail.

For the UMTS communication system, a turbo encoding scheme has been specified for some scenarios and services. A turbo encoder for this purpose comprises a parallel concatenation of two recursive systematic convolutional (RSC) encoders with an interleaver between them. The output of the turbo encoder is formed by multiplexing the information bits b={b$_1$, b$_2$, . . . , b$_N$}, the first and second coded data sequence known as parity bits p$_1$={p$_{11}$, p$_{12}$, . . . , p$_{1N}$} and p$_2$={p$_{21}$, p$_{22}$, . . . , p$_{1N}$}. (For notational convenience, the tail bits of each frame are ignored). A turbo decoder basically consists of two constituent decoders, such as the first and second decoder elements 201, 203 of FIG. 2, corresponding to the two RSC encoders in the transmitter. The received samples, denoted by y$_1$, are de-multiplexed into x$_k^p$, x$_k^{p1}$ and x$_k^{p2}$ representing samples for systematic bit b$_x$, parity bits p$_{1,k}$ and p$_{2,k}$ respectively. The decoder elements in this embodiment are MAP decoder elements, which minimize the probability of error for an information bit given the received sequence, and also provide the probability that the information bit is either 1 or 0 given the received sequence. During the decoding procedure of each of the decoder elements, the Log Likelihood Ratio (LLR) for each information bit is calculated as $$LLR(b_k) = \ln \frac{\sum_{(m,n) \in B^1} \alpha_{k-1}(n) \gamma_k(n,m) \beta_k(m)}{\sum_{(m,n) \in B^0} \alpha_{k-1}(n) \gamma_k(n,m) \beta_k(m)}$$

where y$_k$(n,m), called the branch metric, represents the transition likelihood from state n at time k−1 to state m at time k, given the current received samples u$_k$, here u$_k$ denotes a pair of (x$_k^s$, x$_k^p$). α$_{k-1}$(m) is likelihood of being in state m at time k−1 with the received sequence {u$_1$, . . . , u$_{k-1}$}, and β$_k$(m) denotes likelihood of generating the received sequence {u$_{k+1}$, . . . , u$_N$} from state m at time k. The quantity α$_k$(m) can be expressed as a function of α$_{k-1}$(m) and Y$_k$(n,m) and is calculated by a forward recursion $$a_k(m) = \sum_{n=0}^{M-1} \alpha_{k-1}(n) \gamma_k(, m)$$

$$m = 0, \ldots, M-1$$

where M is the number of states. Reverse or backward recursion for computing the quantity β$_k$(n) from β$_{k+1}$(n) and y$_k$(n, m) is $$\beta_k(n) = \sum_{m=0}^{M-1} \beta_{k+1}(m) \gamma_k(n, m)$$

$$n = 0, \ldots, M-1$$

The numerator of LLR of b$_k$ is computed by summing over a set B$^1$ which denotes that all transitions correspond to b$_k$=1. Similarly, the denominator of LLR of b$_k$ is calculated over a set B$^0$ where all transitions give b$_k$ equals 0.

Hence, the LLR for each bit is determined by a summation over all possible state transitions corresponding to the specific bit value of the product of the probability of being in the previous state given the previously received samples, the probability of a transition from the previous state to the next state given the current received sample, and the probability of receiving the future received samples from being in the next state.

In practice, the true LLR of a bit cannot be guaranteed because the true values of other bits in a channel symbol are not known for sure. Accordingly, in the current embodiment decision feedback, which is obtained in a simple way from the turbo decoder recursions, is used in order to improve the estimate of the LLR compared to the conventional method.

Clearly, if the LLR is calculated based on erroneous feedback bits, overall performance could be worse than that of conventional turbo decoder. Fortunately, in turbo decoding, the reliability associated with each estimated bit is known. Therefore the described embodiment utilises partial decision feedback based on the soft decision (LLR output) of one or both of the decoder elements. That is, only those hard decision bits with high reliability are used to refine the LLR calculation. The feedback bits are determined as $$b_k = \begin{cases} 1 & LLR(b_k) \geq T \\ -1 & LLR(b_k) < -T \\ 0 & \text{Otherwise} \end{cases}$$

where T is a preset threshold. $b_k=0$ means this bit is unknown.

Maximization in LLR determination should be performed over all possible combinations associated with this bit. For example, in 16 QAM case, one unknown bit requires maximization over two channel symbols, two unknown bits requires determination of the largest value among 4 points in the signal constellation; and 3 unknown bits degenerate to a conventional LLR calculation procedure. Simulation results indicate that the partial decision feedback is critical in performance improvement.

It is well known that the conventional turbo decoder only calculates information bits. However, improved performance can be achieved with using partial decision feedback for all code bits including both information and parity bits.

The parity bits could be regenerated by re-encoding of the decoded information bits. However, this may introduce additional delay which could make partial decision feedback impractical. It may also result in high bit error rate because of infinite impulse response of the recursive convolutional encoders, which are constituent encoders of turbo codes. For instance, one error in the decoded information bit may cause multiple errors in re-encoded bits. Therefore, preferably the traditional turbo decoder is modified such that all parity bits are recovered with negligible computation.

In addition to calculating the LLRs for information bits, the modified turbo decoder in accordance with the described embodiment computes the LLRs for parity bits. According to the MAP criterion, the LLR of a parity bit $p_k$ given the received samples $u=\{u_1, \ldots, u_N\}$ can be written as $$LLR(p_k) = \ln\frac{p(p_k=1|u)}{p(p_k=0|u)} = \ln\frac{p(p_k=1,u)}{p(p_k=0,u)}$$

where p(.) denotes probability. Following the same procedure as that for information bits, this gives $$LLR(p_k) = \ln\frac{\sum_{(m,n)\in P^1} \alpha_{k-1}(n)\gamma_k(n,m)\beta_k(m)}{\sum_{(m,n)\in P^0} \alpha_{k-1}(n)\gamma_k(n,m)\beta_k(m)}$$

where $P^1$ and $P^0$ have a similar meaning of $B^1$ and $B^0$ respectively. In turbo decoding, major computation and memory are utilized for determining $y_k(n,m)$, $\alpha_{k-1}(m)$ and $\beta_k(m)$. Once they are available for the information bits, only relatively minor computation is required to determine the LLR of the parity bits. In the log-MAP algorithm, every addition is replaced by max* which is defined as max*(a, b)=max(a,b)+ln(1+exp(-la-bl)).

Simulations have been performed by the applicant to illustrate an example of a possible advantage that may be achieved. This specific simulation related to a turbo decoder with partial decision feedback for 16 QAM modulation over AWGN channel. The 3 GPP turbo code specification with a constraint length K=4 and code rate ⅓ was used. The code black length was 5000 information bits. 12 iterations were used in turbo decoding. A threshold of 2 was used to determine hard decision feedback bits. The simulations showed that for this specific example a performance gain of more than 0.5 dB was achieved.

The invention can be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims.

The invention claimed is:

1. A decoder apparatus comprising:
   a likelihood estimator for generating a sequence of bit value likelihood estimates of a sequence of bit values of multi bit symbols of a data sequence;
   a first decoder element for generating a first decoded data sequence in response to the bit value likelihood estimates;
   a weighting processor for generating a weighted compensation data sequence in response to the first decoded data sequence and reliabilities of the data of the first decoded data sequence; and
   wherein the likelihood estimator is operable to modify the sequence of bit value likelihood estimates in response to the weighted compensation data.

2. A decoder apparatus as claimed in claim 1 wherein the first decoder element is a Maximum A Posteriori (MAP) decoder.

3. A decoder apparatus as claimed in claim 1 wherein the first decoder element is a Soft Output Viterbi Algorithm (SOVA) decoder.

4. A decoder apparatus as claimed in claim 1 wherein the first decoded data sequence comprises data values associated with the reliabilities of the data of the first decoded data sequence.

5. A decoder apparatus as claimed in claim 1 wherein the data sequence comprises an uncoded information data sequence, a first coded sequence generated from encoding of data of the information data sequence and a second coded sequence generated from encoding of interleaved data of the information data sequence;
   wherein the first decoder is operable to generate the first decoded sequence in response to bit value likelihood estimates of the information data sequence and the first coded sequence; the decoder apparatus further comprising:
   an interleaver coupled to the output of the first decoder element;
   a second decoder element coupled to the interleaver and operable to generate a second decoded data sequence in response to bit value likelihood estimates of the information sequence and the second coded sequence.

6. A decoder apparatus as claimed in claim 5 wherein the second decoder element is a Maximum A Posteriori (MAP) decoder.

7. A decoder apparatus as claimed in claim 5 wherein the second decoder element is a Soft Output Viterbi Algorithm (SOVA) decoder.

8. A decoder apparatus as claimed in claim 5 wherein the second decoder is operable to further generate the second decoded data sequence in response to the first decoded data sequence.

9. A decoder apparatus as claimed in claim 5 wherein the decoder apparatus further comprises a de-interleaver coupled between the output of the second decoder element and the input of the first decoder element and wherein the first decoder element is operable to further generate the first decoded data sequence in response to the second decoded data sequence.

10. A decoder apparatus as claimed in claim 9 wherein the decoder apparatus is a turbo decoder apparatus.

11. A decoder apparatus as claimed in claim 5 wherein the weighting processor is operable to generate weighted compensation data for the information data sequence in response to the first decoded data sequence and reliabilities of the data of the first decoded data sequence.

12. A decoder apparatus as claimed in claim 5 wherein the weighting processor is operable to generate weighted compensation data for the first coded data sequence in response to the first decoded data sequence and reliabilities of the data of the first decoded data sequence.

13. A decoder apparatus as claimed in claim 12 wherein the first decoded data sequence comprises decoded data corresponding to the first coded data sequence.

14. A decoder apparatus as claimed in claim 5 wherein the weighting processor is operable to generate weighted compensation data for the information data sequence in response to the second decoded data sequence and reliabilities of the data of the second decoded data sequence.

15. A decoder apparatus as claimed in claim 5 wherein the weighting processor is operable to generate weighted compensation data for the second coded data sequence in response to the second decoded data sequence and reliabilities of the data of the second decoded data sequence.

16. A decoder apparatus as claimed in claim 15 wherein the second decoded data sequence comprises decoded data corresponding to the second coded data sequence.

17. A decoder apparatus as claimed in claims 5 wherein the second decoded data sequence comprises data values associated with the reliabilities of the data of the second decoded data sequence.

18. A decoder apparatus as claimed in claim 1 wherein the weighting processor is operable to weight each bit of the weighted compensation data in response to the likelihood of that bit being a given value.

19. A decoder apparatus as claimed in claim 18 wherein the likelihood estimator is operable to modify a bit value likelihood estimate of a bit of the sequence of bit values in response to the weighted compensation data.

20. A decoder apparatus as claimed in claim 1 wherein the weighting processor is operable to set a value of a bit of the weighted compensation data sequence to a hard decision bit value if the reliability of the decoded data corresponding to the bit is above a threshold.

21. A decoder apparatus as claimed in claim 1 wherein the weighting processor is operable to set a value of a bit of the weighted compensation data sequence to a null value if the reliability of the decoded data corresponding to the bit is less than a threshold.

22. A decoder apparatus as claimed in claim 21 wherein the likelihood processor is operable not to modify a bit value likelihood estimate for a bit corresponding to a bit of the weighted compensation value having a null value.

23. A decoder apparatus as claimed in claim 1 wherein the bit value likelihood estimates are logarithmic likelihood ratios between the probability of a bit having a first value and a second value.

24. A decoder apparatus as claimed in claim 1 wherein the multi bit symbols comprise Quadrature Amplitude Modulated (QAM) symbols having more than four constellation points.

25. A decoder apparatus as claimed in claim 1 wherein the multi bit symbols comprises Phase Shift Keying (PSK) symbols having more than four constellation points.

26. A method of decoding comprising repeating the steps of:
generating a sequence of bit value likelihood estimates of a sequence of bit values of multi bit symbols of a data sequence;
generating a first decoded data sequence in response to the bit value likelihood estimates;
generating a weighted compensation data sequence in response to the first decoded data sequence and reliabilities of the data of the first decoded data sequence; and
modifying the sequence of bit value likelihood estimates in response to the weighted compensation data.

* * * * *